Patented Jan. 10, 1939

2,143,727

UNITED STATES PATENT OFFICE 2,143,727

TRACTOR CONSTRUCTION

David B. Baker, Riverside, Ill., assignor to International Harvester Company, a corporation of New Jersey Application March 5, 1937, Serial No. 129,167

16 Claims. (Cl. 180—54)

This invention relates to a tractor construction. More particularly it relates to the front end construction of a tractor of the agricultural type having a narrow body and a narrow front support.

The principal object of the invention is to provide a front end construction including the radiator support and the steering mechanism. Another object is to completely enclose the steering mechanism and the associated parts. Another object is to devise a construction in which a rigid and substantial mounting is provided for the radiator which is subject to distortion or other forces resulting in injury to the radiator core.

The above and other objects, which will be apparent from the detailed description to follow, are accomplished by a construction in which a vertical steering post extends upwardly about the tractor frame into a combined radiator header and steering gear housing. Said housing is supported rigidly in position by a frame construction rigidly mounted on the forward end of the tractor frame. The radiator is rigidly secured in position by connection with the header and with the frame construction. Other details of construction also effect an improved front end construction for tractors particularly for the narrow agricultural type. In the drawings:

Figure 5 is a section of the frame structure taken on the same line as in Figure 2 and with the structure removed as a single element separate from the tractor; and, Figure 6 is a section on the line 6—6 of Figure 5.

Figure 1:
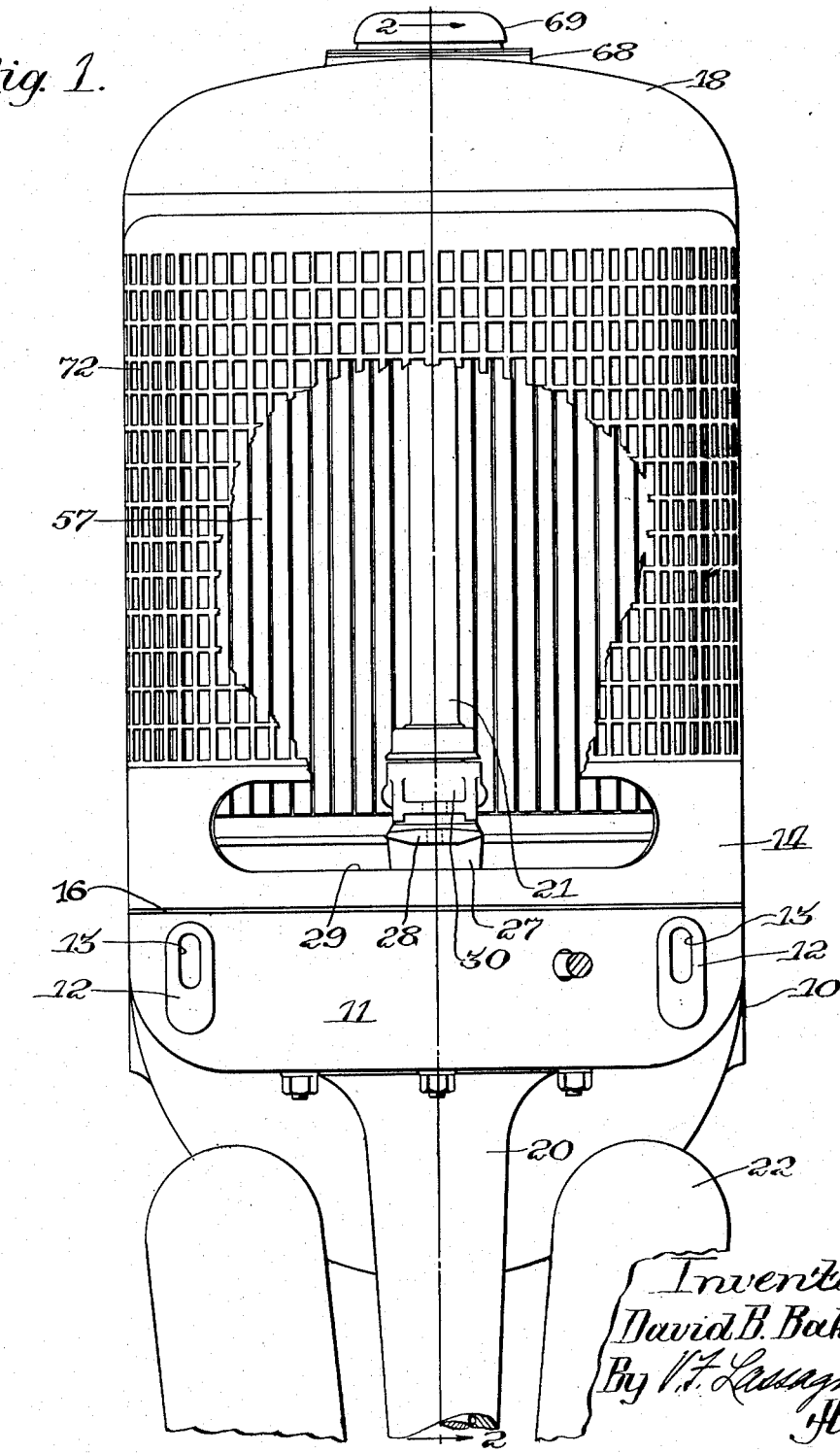
Figure 1 is a front elevation of a tractor embodying the invention, only a portion of the front steerable wheels being shown, and a portion of the grill being broken away to show the interior of the construction.

In agricultural tractors of the type illustrated, the frames are often formed as unitary castings extending from the transmission casing to the front end of the tractor. As illustrated, a frame 10 formed as a casting is shaped to form side frame members and a rearwardly slanting forward portion 11 extending across the front of the frame. Said portion is provided with pads 12 for attaching implements by suitable securing means. Slots 13 are formed in the pads 12 for the insertion of bolts. The upper portion of the frame at its forward end is flattened to provide a base for mounting a frame structure 14 shown apart from the tractor in Figure 5. Said frame structure extends upwardly at each side of the tractor and is connected across the top and bottom thereof. It may be formed as a casting or of heavy pressed metal, as illustrated. A flange 15, formed around the base of the frame structure 14, is adapted to seat on the forward portion of the frame 10. A separating cover and shield plate 16 is first mounted on the frame to seal off the forward portion of the open top frame, thereby preventing the entrance of dirt into the radiator or from the radiator shell into the hollow frame. Said plate is provided with a slot 17 for inserting it in position over the steering column to be hereinafter described. The plate extends rearwardly a substantial distance terminating immediately forwardly of the radiator construction. A plurality of bolts secure the flange 15 of the flange structure and said plate to the frame casting 10.

A combined upper header for the radiator and steering gear housing in the form of a casting 18 is mounted on the top of the frame structure 14. An inturned flange 14' on said frame structure, as best shown in Figure 6, provides a base on which the casting is mounted and secured.

The bottom portion of the frame 10 is offset upwardly at the front end to form a substantially horizontal base 19 to which the front wheel support 20 is rigidly bolted by means of suitable flanges machined to obtain a suitable centering contact. The support 20 carries the steering post 21 which is adapted to carry a pair of pneumatic tired wheels 22, as illustrated. The lower end construction of the steering column and support therefor may be of any conventional construction and has not been illustrated in detail, as in itself the lower end construction of the steering mechanism does not form a part of the present invention.

The steering post 20 extends upwardly through a bearing portion 23 formed on the support 20. A collar 24 rigidly secured to the post 21 is located immediately above the bearing 23. Said collar is provided with off-set shoulders 25 adapted to engage the shoulders 26 of a second collar 27 rotatably mounted on the steering post. The shoulders 25 and 26 are positioned to allow a certain angular movement of the steering column before rotation of the collar 27. Said collar carries a forwardly extending arm 28. This arm extends through an arcuate slot 29 formed in the lower transverse portion of the frame structure 14. Said arm is for the purpose of shifting cultivators and other implements which may be attached to the tractor. A third collar 30 is mounted above the collar 27. Said collar is rigidly secured to the steering post 21.

The steering post 21 extends upwardly into a gear compartment 31 formed as a chamber in the upper header 18. Said chamber is open at the bottom for insertion of the steering gears mounted therein. A worm wheel 32 is rigidly mounted on the tapered end of the steering post within the compartment 31. A cover plate 33 is secured in a fluid tight manner over the opening at the bottom of the compartment forming thereby a grease tight compartment in which lubricant can be carried.

The steering post 21 extends through the cover plate 33 in which a bearing portion 34 provides for rotation of the post. To reduce the leakage of grease, the cover plate 33 is provided with a vertical up-standing annular flange 35. A ring 36 of sealing material between the interior of said flange and the hub portion of the worm wheel 32 provides an adequate seal against the escape of lubricant.

Figure 4:
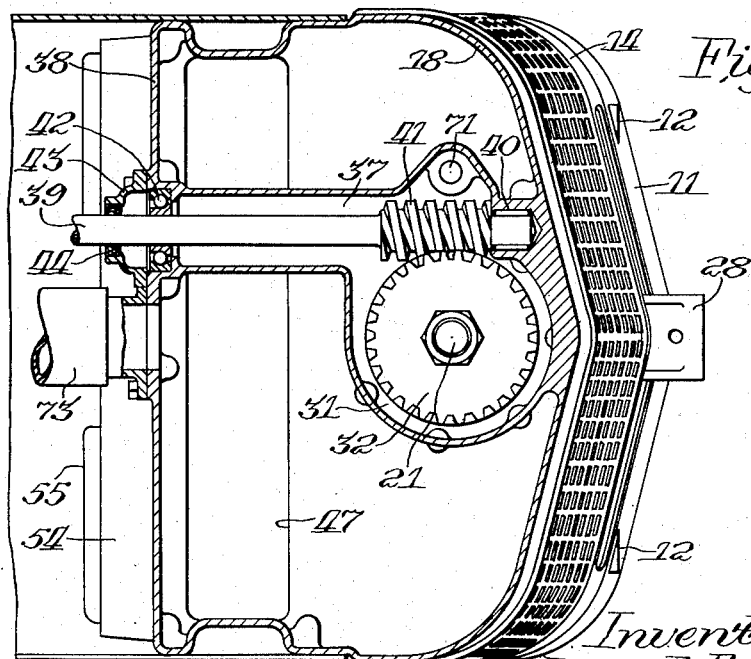
Figure 4 is a section taken on the line 4—4 of Figure 2.

As best shown in Figure 4, a passage or housing 37 is cored in the header 18 extending from the rear wall 38 of the header to the compartment 31. A steering rod 39 extends through said passage-way into the compartment. At the inner end, the rod is rotatably mounted on roller bearings in a bore 40 formed in the casting 18. A worm 41 carried by the steering rod meshes with the worm wheel in the compartment 18. A ball bearing assembly 42 mounted in the rear wall 38 provides a bearing for the rod at that point. A flanged ring 43 carries an annular ring 44 of sealing material for sealing the shaft at the rear where it emerges from the casting.

Figure 2:
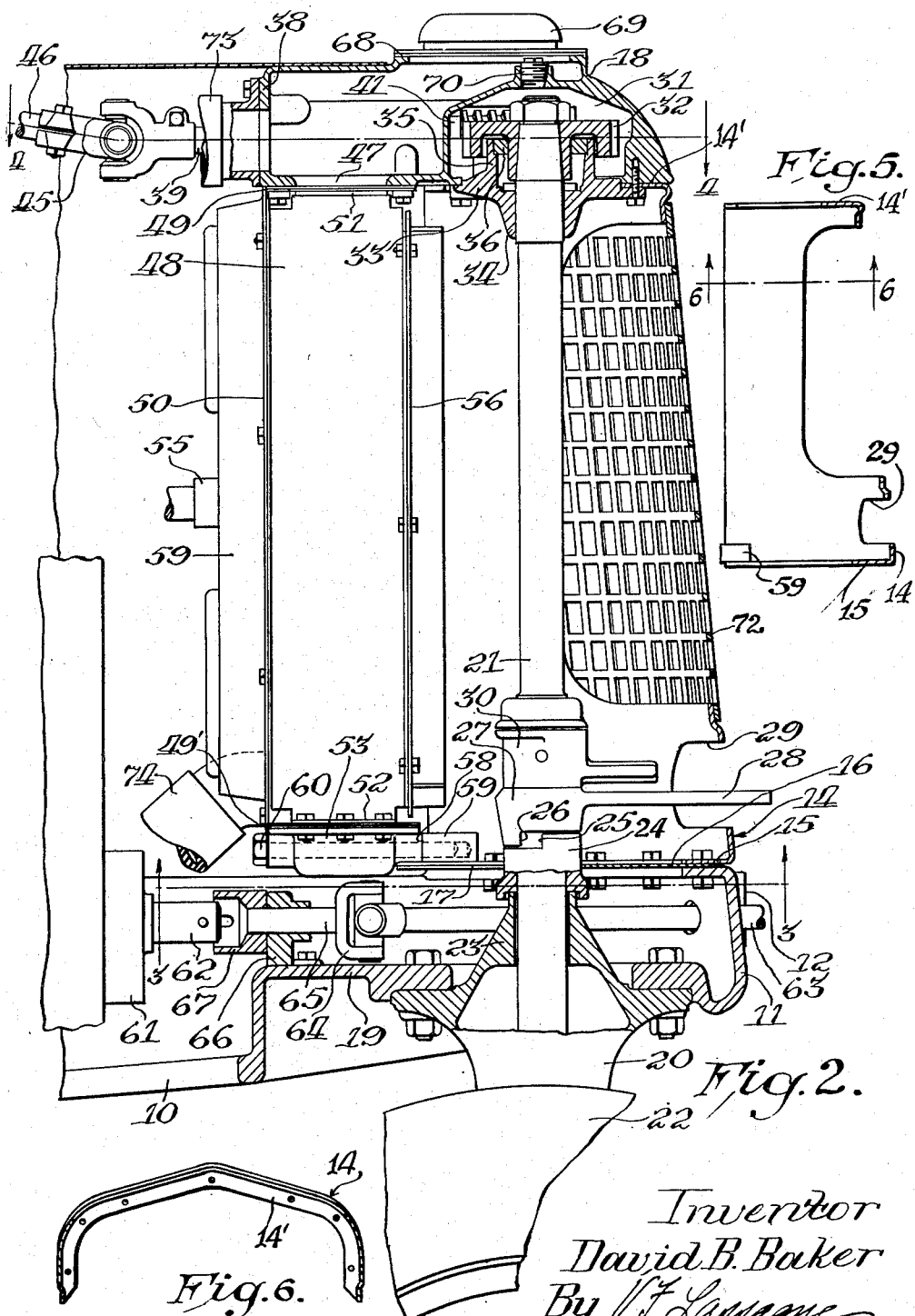
Figure 2 is a vertical longitudinal section of a tractor taken substantially on the line 2—2 of Figure 1 with the exception that the radiator core is not shown in section, but in side elevation.
Figure 3:
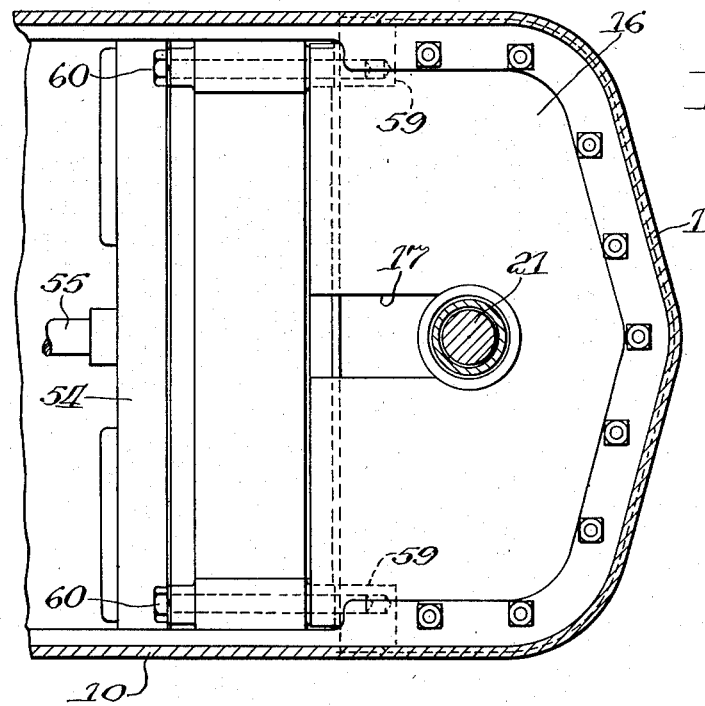
Figure 3 is a section taken on the line 3—3 of Figure 2.

As best shown in Figure 2, the steering rod 39 is connected to a double-Y universal joint 45, which is in turn connected to a steering shaft 46. Said shaft extends rearwardly for steering from the operator's platform from the tractor. With the exception of the compartment 31 and the passage-way 37, the entire upper header 18 forms a water compartment for the cooling system. A transverse opening 47, at the rear of the header on the lower side, communicates directly with the radiator core 48. Said core may be of any conventional construction, such as the tube and fin type widely used. In any type of radiator core, an upper plate 49 and a lower plate 49' are directly attached to the core. The upper plate 49 is clamped against a base formed around the opening 47 on the header 18. Suitable means are provided for securing this plate in a water tight manner.

At each side of the radiator core, a vertical, channel-shaped member 50 is secured by an out-turned flange 51 at its upper end to the header 18. Said flanges serve as means for clamping the plate 49 to the header. At their lower ends, the members 50 are provided with out-turned flanges 52, which serve as means for clamping the lower plate 49' to flanges on the lower header 53. The remainder of the periphery of the plate 49' is secured to the header by suitable bars and bolts. A fan shroud 54 is secured to the rear vertical flanges of the members 50. Portions of a fan 55 have been illustrated to show its position back of the radiator core.

A rectangular frame 56 is secured to the forward vertical flanges of the members 50. Said frame carries the blades 57 of a shutter. Said shutter may be manually operated or automatically controlled, both operating means being old in the art.

The lower header 53 is provided with surfaced portions 58 at the ends on the forward vertical wall which contact with the ends of blocks 59 welded or otherwise secured to the frame structure 14. In the case of a casting, these elements would be formed as integrally cast bosses. Bolts 60 extend forwardly through openings formed in the lower header and are threaded in the block 59. By this means the lower radiator header is rigidly secured to the frame structure 14.

In Figure 2, the forward end portion of an engine 61 has been diagrammatically illustrated. A crank shaft 62 extends from the forward end of the engine. For cranking the tractor, a band crank 63 extends through an opening formed in the forward portion 11 of the frame casting. The shaft of the crank extends at an angle to avoid the steering post. Said shaft is connected by a double-Y universal joint 64 to a short shaft 65 carried by a bearing member 66 mounted on the horizontal portion 19 of the frame. A shaft engaging member 67 is mounted on the shaft 65 for engaging a pin in the end of the crank shaft.

The header 18 is formed with a filler opening 68 covered by a radiator cap 69 for adding water to the cooling system. In order to provide for access to the steering gear compartment 31, an opening in the top of said compartment within the radiator header is provided with a threaded plug 70. Said plug is accessible through the filler opening for access to the steering gear compartment. For draining lubricant from the compartment, a removable plug 71 is located in the bottom of the compartment.

The open front of the frame structure 14 is covered by a perforated grill 72 secured by hinging or other suitable means. The frame construction and the grills form what might be termed a radiator shell. As in this construction the frame structure supports both the radiator header and the upper portion of the steering mechanism, it has not been termed a radiator shell.

The upper header is provided with an inlet 73 for the inflow of water from the cooling system. The lower header 53 is provided with an outlet 74 from which water is withdrawn by a circulating pump of the cooling system.

It will be understood from the above description that applicant has provided a front end construction which is self-supporting and at the same time encloses the steering apparatus and the cooling system. By a construction such as described, a minimum amount of material and a minimum amount of parts have been used to obtain a rigid construction of good appearance. Another important factor in enclosing the different elements is to prevent injury thereto and to shield the parts against snow and rain and against organic materials encountered in the use of farm tractors.

It will be understood that applicant has shown and described only a preferred embodiment of his improved front end construction for tractors. It is to be understood that he claims as his invention all modifications falling within the scope of the appended claims.

What is claimed is:

1. In a tractor having a longitudinally extending frame, a front wheel support secured to the frame at the front end thereof, a steering post carried by said support and extending upwardly through and above the frame, a frame structure mounted on the forward end of the frame and extending upwardly therefrom, said frame structure including side portions spaced laterally from the steering post and transverse vertically spaced top and bottom portions extending around the steering post forwardly thereof whereby an opening is formed for the passage of air, a housing mounted on the top of said frame, said housing being formed with a chamber, the steering post extending into said chamber, and gearing in said chamber operable to angle said steering post.

2. In a tractor having a longitudinally extending frame, a front wheel support secured to the frame at the front end thereof, a steering post carried by said support and extending upwardly through and above the frame, a frame structure mounted on the forward end of the frame and extending upwardly therefrom, said frame structure including side portions spaced laterally from the steering post and transverse vertically spaced top and lower portions extending around the steering post forwardly thereof whereby an opening is formed for the passage of air, said transverse lower portion being formed with a horizontal slot, a steering arm mounted on the steering post and extending through said slot for oscillation therein, a housing mounted on the top of said frame structure, said housing formed with a chamber, the steering post extending into said chamber, and gearing in said chamber operable to angle said steering post.

3. In a tractor having a longitudinally extending frame, a front wheel support secured to the frame at the front end thereof, a steering post carried by said support and extending upwardly through and above the frame, a frame structure mounted on the forward end of the frame and extending upwardly therefrom, said frame structure including side portions spaced laterally from the steering post and transverse vertically spaced top and bottom portions extending around the steering post forwardly thereof whereby an opening is formed for the passage of air, a grill mounted over said opening, a housing mounted on the top of said frame structure, said housing being formed with a chamber, the steering post extending into said chamber, and gearing in said chamber operable to angle said steering post.

4. In a tractor having a longitudinally extending cast frame open at the top, a front wheel support secured to the lower side of the frame at the front end thereof, a steering post carried by said support and extending upwardly through and above the frame, a separating cover plate mounted over the front end of the frame, a frame structure mounted on the top of the forward end of the frame over said cover plate and extending upwardly therefrom, said frame structure being open at the front and rear for the passage of air therethrough, a housing mounted on the top of said frame structure, said housing being formed with a chamber, the steering post extending into said chamber, and gearing in said chamber operable to angle said steering post.

5. In a tractor having a longitudinally extending cast frame open at the top, a front wheel support secured to the lower side of the frame at the front end thereof, a steering post carried by said support and extending upwardly through and above the frame, a separating cover plate mounted over the front end of the frame, the front end of the frame being provided with an opening for a starting crank to extend rearwardly between the cover plate and the lower side of the frame, a frame structure mounted on the top of the forward end of the frame over said cover plate and extending upwardly therefrom, said frame structure being open at the front and rear for the passage of air therethrough, a housing mounted on the top of said frame structure, said casting housing being formed with a chamber, the steering post extending into said chamber, and gearing in said chamber operable to angle said steering post.

6. In a tractor having a longitudinally extending frame, a front wheel support secured to the frame at the front end thereof, a steering post carried by said support and extending upwardly through and above the frame, a frame structure of substantially the same width as the frame mounted on the forward end thereof and extending upwardly therefrom, said frame structure being open at the front and rear for the passage of air therethrough, a transversely extending casting mounted on the top of said frame structure, said casting being formed with a chamber extending upwardly from the lower side of the casting, the steering post extending into said chamber, and gearing in said chamber for angling said steering post.

7. In a tractor having a frame, a front wheel support secured to the lower side of the frame at the front end thereof, a steering post carried by said support and extending upwardly above the frame, a frame structure mounted on the forward end of the frame and extending upwardly therefrom, said frame structure being open at the front side for the entrance of air and being open at its rear side for delivering air to a radiator, a casting mounted on the top of said frame structure, said casting being formed with a chamber, the steering post extending into said chamber, gearing in said chamber for angling said steering post, an upper radiator header formed in the casting, and a radiator secured to said header and extending downwardly therefrom.

8. In a tractor having a frame, a front wheel support secured to the lower side of the frame at the front end thereof, a steering post carried by said support and extending upwardly above the frame, a frame structure mounted on the forward end of the frame and extending upwardly therefrom, a casting mounted on the top of said frame structure, an upper radiator header formed in the casting, said casting being formed with a chamber extending upwardly from its lower side into the radiator header, the steering post extending into said chamber, gearing in said chamber for angling said steering post, and a radiator secured to said header and extending downwardly therefrom.

9. In a tractor having a frame, a front wheel support secured to the lower side of the frame at the front end thereof, a steering post carried by said support and extending upwardly above the frame, a frame structure mounted on the forward end of the frame and extending upwardly therefrom, a casting mounted on the top of said frame structure, an upper radiator header formed in the casting, said casting being formed with a chamber extending upwardly from its lower side into the radiator header, the steering post extending into said chamber, gearing in said chamber for angling said steering post, said casting being formed with a filler opening for the radiator header and a lubricant opening for the chamber accessible through the filler opening closures for said openings, and a radiator secured to said header and extending downwardly therefrom.

10. In a tractor having a longitudinally extending frame, a front wheel support secured to the frame at the front end thereof, a steering post carried by said support and extending upwardly through and above the frame, a frame structure mounted on the forward end of the frame and extending upwardly therefrom, said frame structure being open at the front and rear for the passage of air therethrough, a casting mounted on the top of said frame, said casting being formed with a chamber extending upwardly from the lower side of the casting, the steering post extending into said chamber, gearing in said chamber for angling said steering post, and a cover plate through which the steering post rotatably extends secured to the casting and extending across said chamber.

11. In a tractor having a longitudinally extending frame, a front wheel support secured to the frame at the front end thereof, a steering post carried by said support and extending upwardly above the frame, a frame structure mounted on the forward end of the frame, said frame structure being open at the front and rear, a casting mounted on the top of said frame structure, said casting being formed with a chamber, the steering post extending into said chamber, gearing in said chamber for angling said steering post, an upper header formed in the casting, a radiator secured to said header and extending downwardly therefrom, and a lower header secured to the bottom of said radiator, said lower header being secured to the side portions of the frame structure.

12. In a tractor having a longitudinally extending frame, a front wheel support secured to the lower side of the frame at the front end thereof, a steering post carried by said support and extending upwardly above the frame, a frame structure mounted on the forward end of the frame and extending upwardly therefrom, said frame structure being formed with vertical side portions and being open at the front side for the entrance of air and being open at its rear side for delivering air to a radiator, a casting mounted on the top of said frame structure, said casting being formed with a chamber extending upwardly from its lower side, the steering post extending into said chamber, gearing in said chamber for angling said steering post, an upper radiator header formed in the casting, a radiator secured to said header and extending downwardly therefrom, and a lower header secured to the bottom of said radiator, said lower header being secured to the bottom of the frame structure.

13. In a tractor having a longitudinally extending frame, a front wheel support secured to the frame at the front end thereof, a steering post carried by said support and extending upwardly above the frame, a frame structure mounted on the forward end of the frame and extending upwardly therefrom, said frame structure being open at the front and rear, a casting mounted on the top of said frame structure, said casting being formed with a closed chamber and a longitudinally extending steering shaft housing communicating with the chamber, the steering post extending into said chamber, gearing in said chamber, a steering shaft extending through the housing into said chamber and associated with said gearing for angling said steering post, an upper radiator header formed in the casting, and a radiator secured to said header and extending downwardly therefrom.

14. In a tractor having a cast frame open at its upper side at the front end, a front wheel support secured to the lower side of the frame at the front end thereof, a steering post carried by said support and extending upwardly through and above the frame, a frame structure mounted on the forward end of the frame and extending upwardly therefrom, said frame structure being open at the front side for the entrance of air and being open at its rear side for delivering air to a radiator, a casting mounted on the top of said frame, said casting being formed with a chamber extending upwardly from its lower side, the steering post extending into said chamber, gearing in said chamber for angling said steering post, and a separating plate mounted above the frame and retained in position between the frame and the frame structure, said plate extending rearwardly and terminating adjacent the lower radiator header.

15. In a tractor having a longitudinally extending frame, a steering post support secured to the frame at the front end thereof, a steering post supported and extending upwardly through said support, a frame structure mounted on the forward end of the frame and extending upwardly therefrom, said frame structure being open for the passage of air therethrough, a housing mounted at the top of said frame structure, steering mechanism carried by said housing, steering connections between said mechanism and said steering post, and a radiator mounted on and entirely carried by the frame structure.

16. In a tractor having a longitudinally extending frame, a steering post support secured to the frame at the front end thereof, a steering post supported and extending upwardly through said support, a frame structure mounted on the forward end of the frame and extending upwardly therefrom, said frame structure being open for the passage of air therethrough, a housing mounted at the top of said frame structure, steering mechanism carried by said housing, steering connections between said mechanism and said steering post, said housing being provided with a compartment forming an upper header for a radiator, and a radiator secured to said header and extending downwardly at the rear of the frame structure.

DAVID B. BAKER.